W. H. BERRY.
Grain-Binder.

No. 222,231. Patented Dec. 2, 1879.

Fig. 5.

W. H. BERRY.
Grain-Binder.

No. 222,231. Patented Dec. 2, 1879.

Attest:
W. A. Redmond
J. Henry Kaiser

Inventor:
William H. Berry,
by H. W. J. Howard
Attorney

W. H. BERRY.
Grain-Binder.

No. 222,231. Patented Dec. 2, 1879.

Attest:
W. A. Redmond
J. Henry Kaiser.

Inventor:
William H. Berry,
by G. H. W. J. Howard
atty

N. PETERS, PHOTO-LITHOGRAPHER, WASHINGTON, D. C.

UNITED STATES PATENT OFFICE.

WILLIAM H. BERRY, OF CHESTER, PENNSYLVANIA.

IMPROVEMENT IN GRAIN-BINDERS.

Specification forming part of Letters Patent No. 222,231, dated December 2, 1879; application filed February 8, 1879.

*To all whom it may concern:*

Be it known that I, WILLIAM H. BERRY, of Chester, in the county of Delaware and State of Pennsylvania, have invented certain Improvements in Grain-Binders, of which the following is a specification; and I do hereby declare that the same is a full, clear, and exact description of my said invention, which will enable any person skilled in the art to which it most nearly appertains to make and use the same, reference being had to the accompanying drawings, and to the letters of reference marked thereon.

This invention relates to certain improvements in machinery for bundling and binding grain, wherein bands formed from cut grain are preferably used, but which are equally adaptable for the employment of bands of other suitable material.

The machine herein described is shown as operating in connection with an ordinary cutter-bar and reciprocating cutter and with an endless-belt rake; but the machine may be used separately from the reaper and rake, or either of them, if desired.

In the construction of my improved grain-binder there is employed a carrying-wheel mounted upon a shaft and operated by suitable gearing, the said carrying-wheel bearing one or more systems of binding mechanism, said systems being operated by a cam-plate and other mechanism, whereby rapid action in binding may be obtained without giving undue speed to any of the parts of the machine.

Heretofore in grain-binders where the system of duplication herein shown has not been employed, it has been found that in order to obtain rapid results the machinery had to be run at a high rate of speed, to the great detriment of the machine.

In my invention the revolutions of the carrying-wheel, bearing several complete systems of binding mechanism, may be comparatively slow, and no overworking of any of the said systems will occur, though the best results will follow as to the amount of work performed.

The first part of my invention embraces the combination, with a carrying-wheel, of a banding and twisting mechanism, the same being caused, by suitable operating devices and by positive movements, to span the bundle, grasp the band with a variable and adjustable tension, place the band around the bundle, allowing for variations in its size, and to twist the ends of the band together or about each other. This part of my invention also includes a tucking mechanism, by means of which the tucker is advanced after the twisting has been completed, grasping the portion of the band that is around the bundle, firmly holding it against a suitable stop while the tucker proper passes the twisted ends between the band and bundle, which tucking devices are then caused to recede, allowing for the escape of the bundle and the successive operations of various other parts of the machine.

This part of my invention also combines with the carrying-wheel a system of stationary and oscillating sheaf-hooks, whereby the unbound bundle is automatically received from the cradle and held during the act of banding, twisting, and tucking, and from which the bundle, when bound, is released by its own weight.

The invention consists, secondly, in a system of compressing-tapes, which, having a certain degree of tension placed upon them, tend to compress the bundle and form it of the required density.

Thirdly, the invention consists in the combination of a cradle with suspended guides, having a certain tension placed thereupon, whereby the unbound grain is allowed to enter, but which, after its entrance, is prevented from escaping, and more effectually delivered to the sheaf-hooks.

The invention consists, fourthly, in a novel band-hopper, in which grain selected by reason of its length and general fitness for banding is placed.

Fifthly, the invention consists in the general combination, with the cam-plate, of the carrying-wheel, banding and twisting mechanism, tucking devices, and sheaf-hooks.

Sixthly, the invention consists in the general combination of the carrying-wheel, banding and twisting mechanism, tucking devices, and sheaf-hooks with the cam-plate, cradle, compressing-tapes, and band-hopper.

The invention consists, lastly, in the construction and arrangement of various details of the machine, as also in certain combinations of details, all as hereinafter fully set forth.

In the following description of the invention.

Similar letters of reference indicate similar parts in all the views.

A is the frame of the machine, which may be attached to or form a part of the frame of a reaper, and support the cutter-bar and rake, in which case it would rest upon wheels, which are represented by A'.

Figure 5:
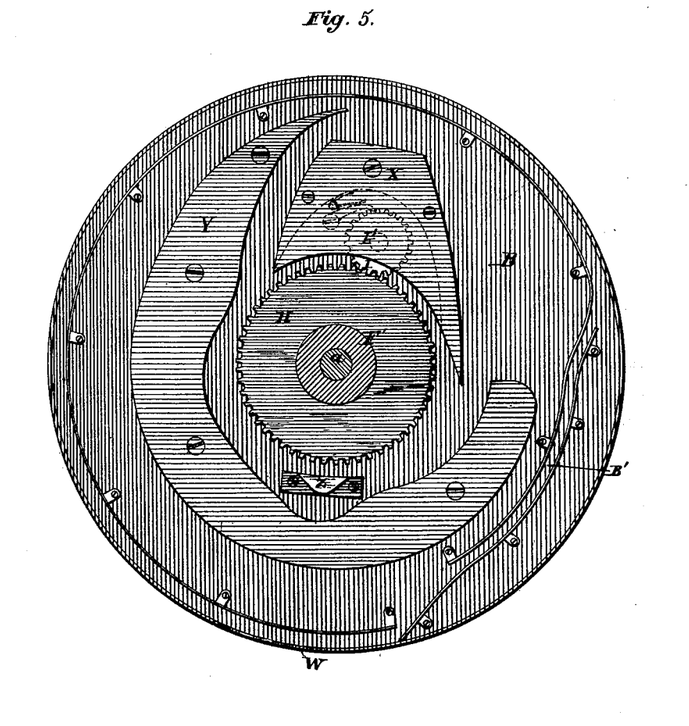
Fig. 5 is a face view of the cam-plate.

To the frame A is attached a cam-plate, B, upon the rear face and rim of which are located the various cams or cam-faces necessary in the production of the movements of the working parts of the machine. A face view of the cam-plate is shown in Fig. 5.

Centrally of the cam-plate is secured one end of a stationary shaft, $a$, at a right angle to the face of the cam-plate, the other end being supported by a pedestal or bearing standing upon the rear portion of the frame A. Mounted upon the shaft $a$ is a revoluble carrying-wheel, F, upon which are arranged one or more complete systems of binding mechanism.

The carrying-wheel is provided with one or more radial slots or guides, $b$, at the outer extremity of each of which is situated a bearing, $b^2$, in which a part of the binding mechanism, hereinafter described, is supported. Upon the face of the carrying-wheel, and at the inner extremity of each of said slots or guides $b$, is placed a bearing, $c$, each of which sustains the inner end of one of the complete systems of banding and twisting devices hereinafter explained.

For convenience' sake, in the following description the machine will be contemplated as being provided with but one of said systems, as all would be alike were more than one system employed.

Figures 8, 10:
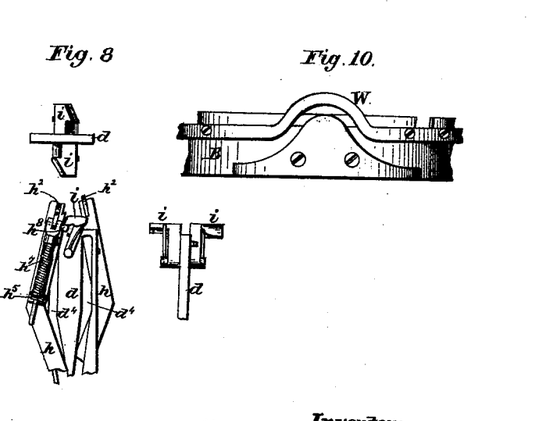
Fig. 8 shows details of the band-hook and twisting mechanism.
Fig. 10 shows a part of the cam-plate.

The said banding and twisting devices are constructed as follows; in the consideration of which special reference may be had to Figs. 3, 6, and 8: A shaft, $d$, having a flat extension, as shown more particularly in Fig. 6, carries upon its flattened extension a sliding head, $d'$, centrally recessed at $d''$, in which recess is seated the bearing $e$, forming a part of the cross-head $e'$. The cross-head has a sliding or reciprocating movement in the radial slot or guide $b$ of the carrying-wheel F. The sliding head $d'$ is formed in two parts, centrally united and held together by screws or bolts. The inner end or cylindrical portion of the shaft $d$ is supported by the bearing $c$, before alluded to, secured to the face of the carrying-wheel F.

The shaft $d$ is provided with a collar, $d^3$, which rests against the inner face of the bearing $c$ and the elongated hub $g$ of the carrying-wheel F, thus preventing an end or radial movement of the shaft. Keyed to said shaft is a pinion, $g'$, a flange, $g''$, being also rigidly attached to the shaft. The flange $g''$ is flattened at $g^3$, by means of which construction it is held stationary when the pinion $g'$ is disengaged or inoperative.

Figure 6:
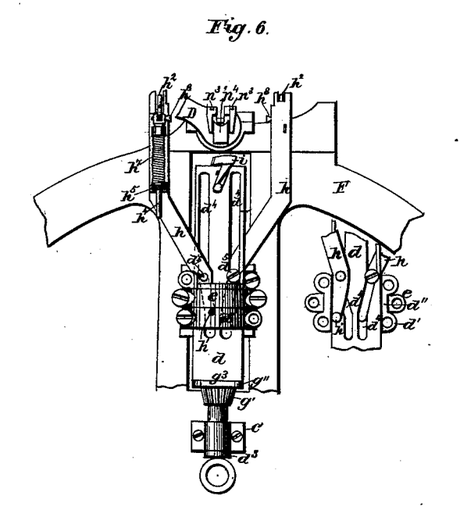
Fig. 6 is a front view of the banding and twisting mechanism, the band-arms being extended.

Formed in the flattened extension of the shaft $d$ are two slots, $d^4$, having shapes shown in Fig. 6. Within each of said slots is a pin, $d^5$, secured to one of the band-arms $h$, which arms at their inner extremities are pivoted at $h'$ within the sliding head $d'$, one arm being pivoted in each half of the head. The arms $h$ are provided at their outer ends with the band-hooks $h^2$, pivoted to the lugs $h^3$. To a projection at the heel of each of said hooks is attached a rod, $h^4$, the inner end of each rod having a bearing in the lug $h^5$. Surrounding the rod $h^4$, and confined between the lug $h^5$ and the tension-nut $h^6$, is a spiral spring, $h^7$, the elasticity of which, when exerted, tends either to hold the hook $h^2$ closed or open, as the point of connection is changed with relation to the pivotal point and the inner bearing of the rod $h^4$ in the lug $h^5$.

In the movement outward of the sliding head $d'$ the pins $d^5$ are brought to the divergent parts of the slots $d^4$, thus causing their respective arms to diverge or separate. In the reverse movement of the head the arms are, of course, brought together. As the respective arms are thus caused to approach, the pin $h^8$, situated in each of the rods $h^4$, having a conical head, as shown particularly in Fig. 6, engages a spring-hook, $i$, arranged to receive it, (see Figs. 6 and 8,) the said hooks being pivoted at opposite sides of the shaft $d$, at the extreme outer end thereof. (See Fig. 8.)

The spring-hooks $i$ are constructed so that when the hooks $h^2$ are closed the pins $h^8$ will engage the former; but upon the hooks $h^2$ being drawn to their open position the pins are permitted to pass through spaces cut in the hooks $i$, (see Fig. 9,) and it will be seen that the band-arms cannot have their outward movement toward the periphery of the carrying-wheel F without opening the hooks $h^2$, as before stated, and that the hooks will remain open by reason of the change in the relative position of their pivotal points.

The outer or convex portion of each hook $h^2$ is provided with a projection, $h^9$, (see Fig. 3,) which at the proper moment strikes a stationary part of the machine, as hereinafter described, and thereby effects the closing of the hook.

The cross-head $e'$ is provided in the space between the cam-plate and carrying-wheel with a roller, $k$, (see Figs. 3 and 7,) having a rotary movement upon the pin $k'$, which roller is the medium whereby movement is obtained from the cam-plate and transmitted to the banding and twisting mechanism as a system.

C (see Fig. 3) is a frame-work attached to the carrying-wheel F, and supported by a radial brace, C'. A bearing, $b^3$, similar to $b'$, is formed in said frame-work, the said two bearings $b^2$ $b^3$ constituting the supports for the oscillatory sheaf-hooks D. To a portion of the frame-work C are attached the stationary sheaf-hooks D'.

The oscillation of the movable sheaf-hooks is accomplished in the following manner: In each of the bearings $b^2$ $b^3$ is placed a hollow shaft, $l$ $l'$, to each end of which is secured one of the movable sheaf-hooks, the two central hooks being united by the rod $l^4$, attached to the projections $l^3$. (See Fig. 3.) The object of using a separate shaft for each pair of sheaf-hooks is to leave a space between the two center hooks for the passage of the band around the bundle.

Figure 3:
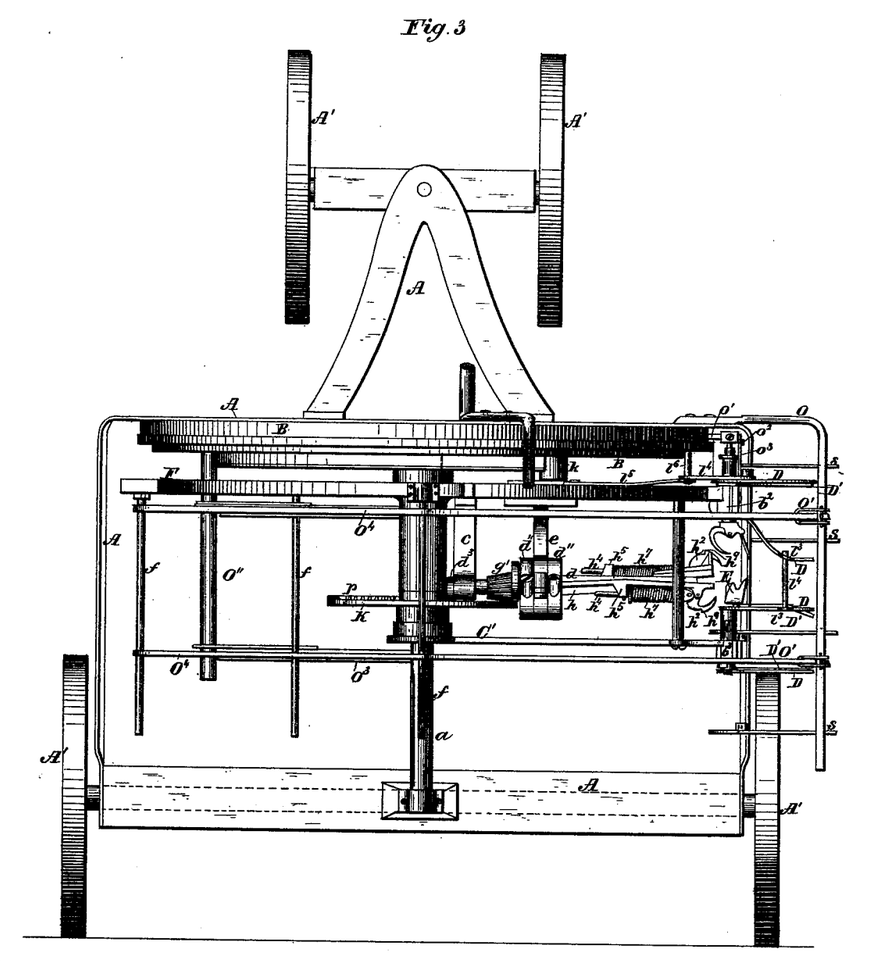
Fig. 3 is a plan of the machine, the sheaf-hooks being shown in the act of closing on the bundle.
Figure 7:
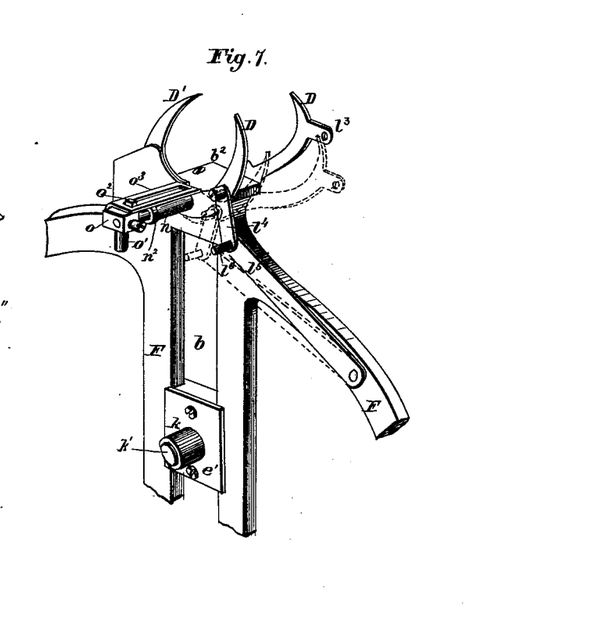
Fig. 7 is a perspective view of a portion of the oscillating sheaf-hook and tucking mechanism, with the cross-head in the carrying-wheel, the dotted lines showing the sheaf-hooks in a position different from that shown in full lines.

To the oscillating sheaf-hook nearest the cam-plate is pivoted a link, $l^4$, Fig. 7, to which is pivoted a link, $l^5$, in turn pivoted to the carrying-wheel F, a pin, $l^6$, being at the junction of the two links and projecting toward the cam-plate, Fig. 3. The said pin engages the cam B' of the cam-plate B, the cam being shaped to give the proper motions to the oscillating sheaf-hooks. (See Fig. 3.)

Through the hollow shaft $l$ passes the tucking mechanism, (see Figs. 11, 12, and 13,) which consists of the tucker-shaft $n$, which is itself a hollow cylinder, the major portion of which constitutes the chamber $n'$. On the end nearest the cam-plate is the check-collar $n''$. To the end of the shaft $n$ farthest from the cam-plate are attached the fingers $n^3$, and also is pivoted the tucker $n^4$. To the tucker $n^4$ is pivoted a connecting-link, $n^5$, which is in turn connected to the tucker-rod $n^6$, which works in a smaller bore of the tucker-shaft $n$, at the end of the same nearest the tucker.

Figure 11:
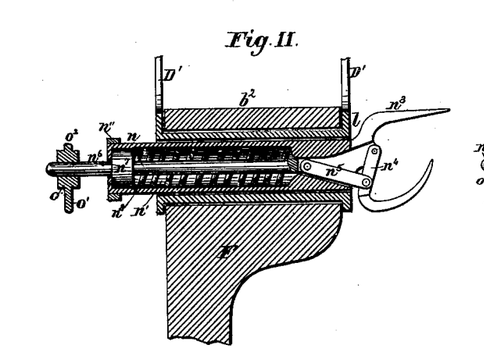
Figs. 11, 12, and 13 are enlarged views of the tucking mechanism in its different positions.
Figure 12:
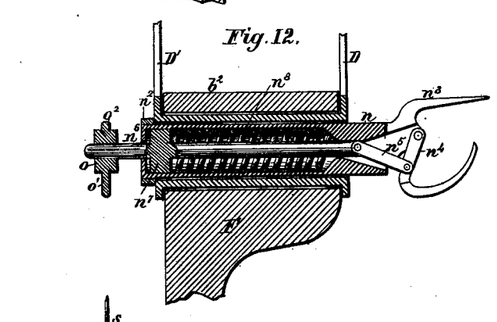
Figures 13, 14:
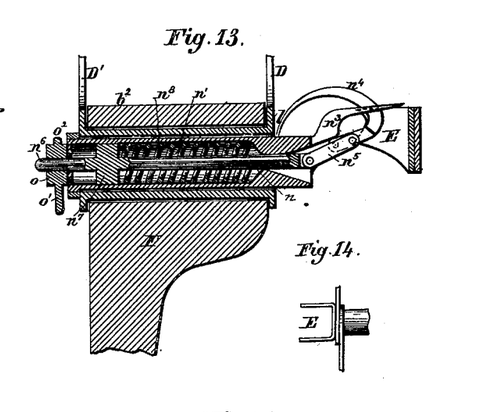
Fig. 14 is a view of a detail hereinafter described.

The tucker-rod $n^6$ is provided with a collar, $n^7$, which serves as a compressor for the spiral spring $n^8$, and also, by fitting to the chamber $n'$, forms a support and guide for the rod.

At the end of the tucker-rod $n^6$ nearest the cam-plate, and projecting over the rim of the same, is secured the cross-head $o$, having the pin $o'$ and lug $o^2$, which are supported by the guide $o^3$, rigidly secured to the carrying-wheel F. The guide admits of the sliding movement of the tucking mechanism.

To one of the fixed sheaf-hooks D' is attached a U-shaped stop, E, Figs. 13 and 14, which holds the band at the tucking operation, and prevents the retreat of the band from before the tucker on its advance.

The carrying-wheel F is caused to revolve on the shaft $a$ by means of a gear-wheel, H, keyed to the short hub F' of the carrying-wheel, which gear is operated by the pinion I on the shaft I', having its bearing in the cam-plate B. The pinion I obtains its motion from the running-gear of the machine or otherwise.

The cam-plate B is furnished on its rear face and periphery with the cam-faces X, Y, Z, B', and W. (See Figs. 5 and 10.)

The cam X is designed to operate the cross-head $e'$, actuating the banding and twisting mechanism, by carrying the same outward or toward the periphery of the carrying-wheel. The cam Y is intended to produce the opposite movement of the said parts.

Z is designed to advance the cross-head sufficiently to release the band for the action of the tucker. The tucker-cam is shown by W, Fig. 10, the greater portion of which is in the form of a guide for the pin $o'$, which guide serves until the cam proper is reached, upon which the pin rides, effecting the operation of the tucker.

As before stated, the cam-plate B carries at its center the shaft $a$, upon which is revolved the carrying-wheel F. To the said shaft is keyed the lock-wheel K, only a portion, $p$, of whose face is geared, the rest of the face consisting of a plain surface, $p'$. (See Fig. 9.)

Figure 9:
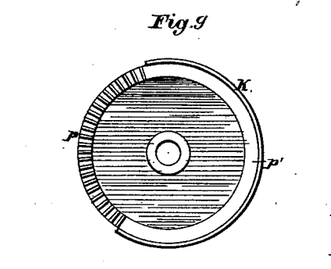
Fig. 9 is a view of a detail of the mechanism employed in operating the twisting devices.

In the operation of the machine the geared and plain faces of the wheel engage alternately the pinion $g'$ on the shaft $d$ and the flattened surface $g^3$ on the flange $g^2$ on said shaft, thus alternately revolving and locking the binding and twisting devices at the respective stages of the operation of the machine.

Secured to the upper portion of the cam-plate B, and projecting over the machine to the same plane in which the shaft $d$ works, is the band-hopper L. (See particularly Fig. 15.) It may be a box or latticed receptacle, and is designed to hold the bundles of loose straw selected for banding.

Figure 15:
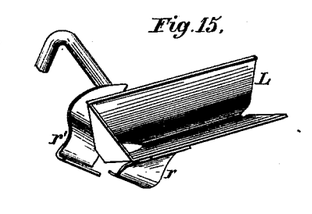
Fig. 15 is a perspective view of the band-hopper.

The plates $r$ $r'$ are the stationary parts of the machine (hereinbefore alluded to) against which the projections $h^9$ on the band-hooks $h^2$ strike when the said hooks are to be closed in order to seize the band-straw.

It will be seen that the forward lower corner of the hopper is cut away to allow the egress of the band-straw, and also that the bottom of the hopper is narrowed in order to allow it to be spanned by the band-hooks.

Figure 1:
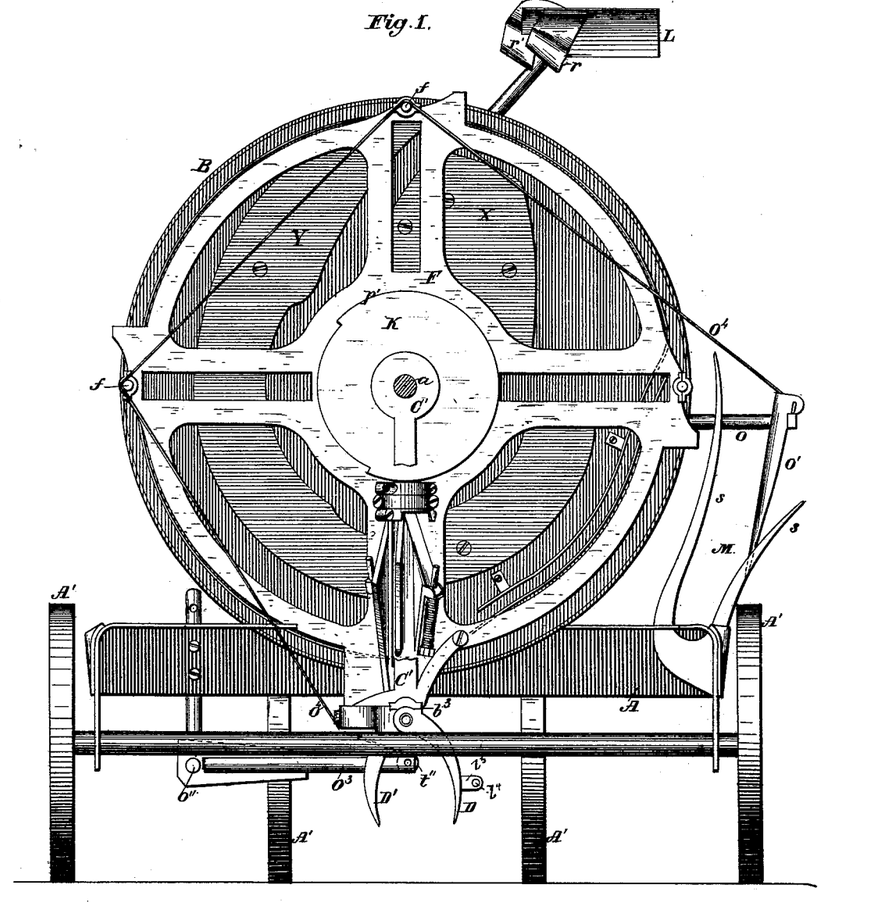
Figure 1 is a rear elevation of the machine, or, in other words, a face view of the operating mechanism, the sheaf-hooks being represented as on the point of discharging the bound bundle.
Figure 2:
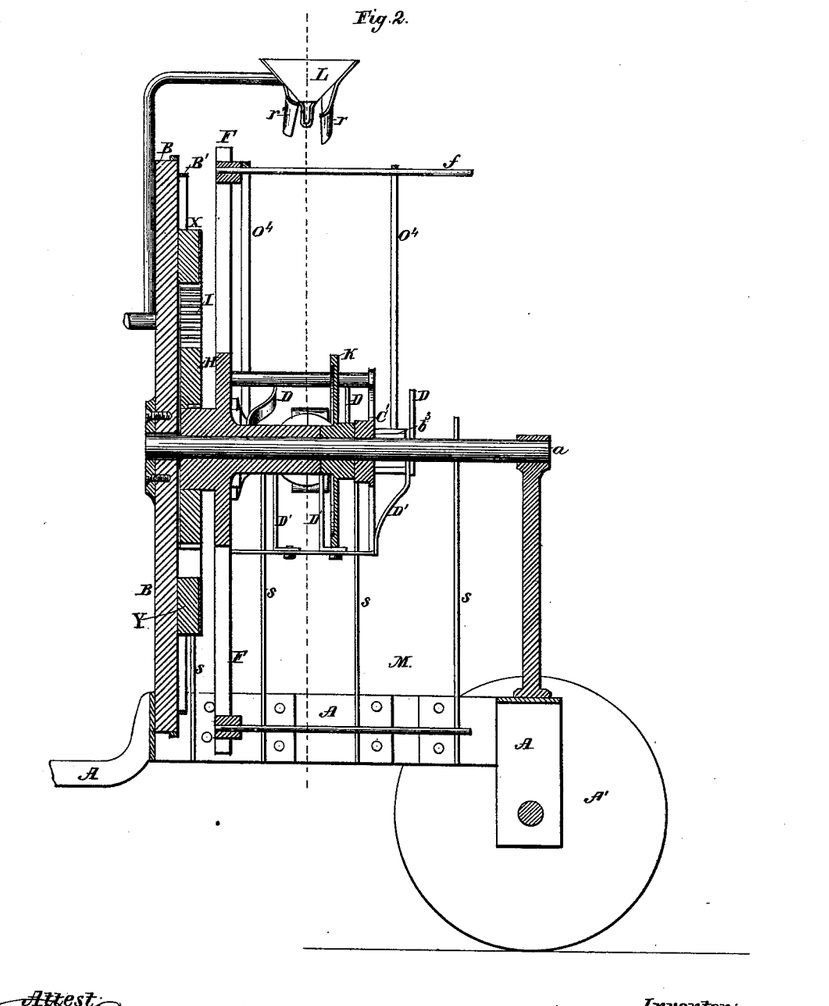
Fig. 2 is a sectional elevation through the frame, cam-plate, and carrying-wheel.
Figure 4:
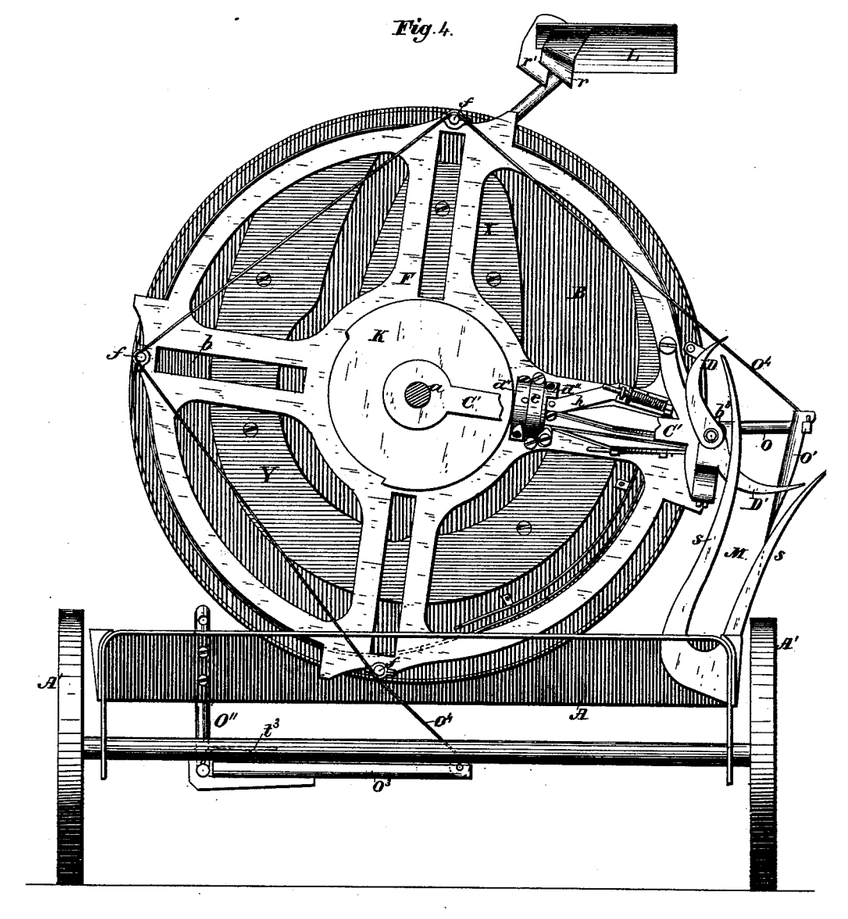
Fig. 4 is a face view of the machine, the sheaf-hooks and their contiguous parts being shown in the act of closing on the bundle.

The cradle M consists of a series of tines, $s$, secured to the frame A. (See Figs. 1, 2, and 4.) Attached to the cam-plate B is the brace O, from which are suspended the wedge-shaped hooks O'.

Figure 16:
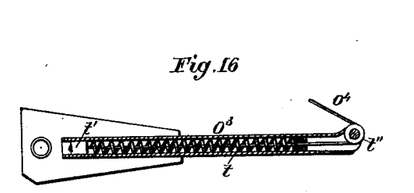
Fig. 16 is a sectional view of the spring-tubes for giving the tension to the compressing-tapes.

To the frame A, at the opposite side of the machine, is secured the brace O'', upon which are mounted the spring-tubes $O^3$, adapted to have an oscillating movement thereupon. The construction of said tubes is shown in Fig. 16, from which it will be seen that there are in each a spiral spring, $t$, and a plug, $t'$, to which the end of the compressing-tape $O^4$ is attached, the tape passing through the spring and over the sheave $t''$, mounted upon a pin at the end of the tube $O^3$. Upon the brace O' is a stop, $t^3$, which, by contact with the tube $O^3$, prevents it from too great movement upward.

The compressing-tape $O^4$, after leaving the sheave $t''$, is, where but one system of binding mechanism is used, brought over pins $f$, projecting from the carrying-wheel F, and attached to the wedge-shaped guides O', suspended from the brace O. Where a series of binding systems are used, the compressing-tapes $O^4$ are carried over the various systems, the pins $f$ being dispensed with.

Figure 17:
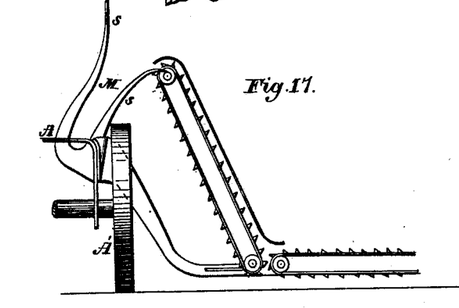
Fig. 17 shows a mode in which the grain-binder may be combined with an ordinary cutter-bar and reciprocating cutter and with an endless-belt rake.

The operation of the machine is as follows: The grain is cut by the reciprocating cutter in the ordinary manner, and falls upon an endless belt, and is deposited in the grain-cradle M, (see Fig. 17,) where it awaits the combined action of the stationary and oscillating sheaf-hooks D D', which, after having released a bound bundle, are being prepared to receive a next or unbound bundle. Having reached the cradle M, the hooks pass between the respective tines $s$ of the cradle M and raise the contents of the latter, the said contents being guided by the suspended wedge-shaped guides O', and thereby prevented from escaping from the cradle, being carried up against the compressing-tapes $O^4$, which compress the bundle to the requisite density, the required tension having previously been applied to the tapes through the medium of the springs $t$ in the tubes $O^3$. The rotary movement of the carrying-wheel F, bearing the sheaf-hooks, continuing, they are caused by the action of the cam B' on the cam-plate B to close, thus forming the bundle.

During the formation of the bundle the band-arms $h$ and various band-twisting devices have remained stationary, except as to the rotary movement common to all parts borne by the carrying-wheel, held in said stationary position by the flat surface $g^3$ resting upon the plain or untoothed surface $p'$ of the lock-wheel K.

The bundle having been formed, the roller $k$ on the pin $k'$ of the cross-head $e'$, sliding in the radial slot $b$ of the carrying-wheel F, strikes the cam X, driving the cross-head $e'$ toward the periphery of the carrying-wheel F, the band-arms $h$, as they move outward, diverging in order to straddle the bundle then held by the sheaf-hooks. The rotary movement of the carrying-wheel continuing, as also the outward movement of the pivoted band-arms, the latter are brought immediately under the band-hopper L, in which grain selected by reason of its length for banding is placed, the forward lower corner being cut away to allow the grain to project, and the whole bottom being narrowed, so that the band-hooks may span it. At this point of the operation of the machine, the projection $h^9$ on the forward band-hook, $h^2$, is brought in contact with an inclined guide-plate, $r$, attached to the hopper L, which plate causes the band-hook to close, and thus firmly grasp near its end a sufficient quantity of the straw to be used for banding.

As the rotary movement is continued, the rear band-hook, immediately following the forward one, in turn strikes a similar guide-plate, $r'$, on the opposite side of the hopper, and is in turn closed, but not until it has passed the limit of the hopper, in order to prevent its seizing straw other than that carried by the forward hook. The band being thus separated or removed from the hopper and held by the respective hooks, the former grasping the end firmly, while the latter takes a somewhat looser hold at a point near the middle, the aforesaid roller $k$ in the cross-head $e'$ engages the cam Y, by means of which the cross-head and its accompanying parts are drawn toward the center of the carrying-wheel, the pivoted band-arms at the same time converging or approaching each other by the co-operation of the slots and pins aforesaid, they placing the straw band around the bundle, allowing for variations in the size of the same by means of the tension upon the band-hooks.

It now remains for the band to be twisted and tucked. The rotary movement continuing, the toothed portion $p$ of the lock-wheel K engages the bevel-pinion $g'$, causing the banding mechanism to revolve in its respective journals $e$ and $c$, thus commencing a twisting movement, which continues as long as the engagement of the toothed portion of the wheel and the pinion continues, giving a sufficient number of—say two—full revolutions to the straw band. The flat surface $g^3$ of the flange $g''$ is again brought in contact with the plain or untoothed portion $p'$ of the lock-wheel K, and the banding and twisting mechanism is again held stationary, except as to the general rotary movement.

The tucking mechanism is now called into action, the tucker proper being made to advance to its position for tucking. The construction of these parts is specially shown in Figs. 11, 12, and 13, Fig. 11 showing the parts in section before the inauguration of the forward movement of the tucker. Fig. 12 is a similar sectional view, showing the end of the said movement, while Fig. 13 shows the position of the tucker at the close of its partially rotary action.

The following is a description of the movement of these parts: The band, having been placed around the bundle, is twisted immediately in front of the U-shaped stop E, when the pin $o'$ in the cross-head $o$, engaging the camway W on the rim of the cam-plate B, causes the rod $n^6$ to advance, carrying with it, by means of the resistance of the spring $n^8$, the whole of the tucking mechanism from the position shown in Fig. 11 to that shown in Fig. 12, the said mechanism being supported by and guided in the hollow shaft $l$ and the guides $o^3$. The tucker-shaft having advanced until the check-collar $n^2$ has struck the end of the hollow shaft $l$, this position of the parts being shown in Fig. 12, the end movement of the tucker-shaft $n$ is stopped. The motion of the tucker-rod $n^6$ still continuing, and the spring $n^8$ being compressed in front of the collar $n^7$, the pivoted tucker, by means of the connecting-rod $n^5$, is given a partially rotary movement between the fingers $n^3$ to the position shown in Fig. 13.

During the end, and before the rotary movement of the tucker, the fingers $n^3$ have been inserted by the end movement of the tucker-shaft $n$ between the bundle and band.

The effect of the U-shaped stop E is to prevent the possible retreat of the band, and the result of the rotary movement of the tucker is the carrying of the twisted ends under the band or between the band and the bundle.

The pin $o'$ still traversing the slotted portion of the camway W, the rod $n^6$ is drawn toward its original position until the tucker $n^4$ is brought back to the position shown in Fig. 12. The spring $n^8$ having in the meantime held the tucker-shaft $n$ in the position shown in Fig. 12, the retrograde movement of the rod $n^6$ still continues, and the tucker-shaft is drawn to the first position shown in Fig. 11, thus releasing the band from the grasp of the fingers. Simultaneously with the rotary movement of the tucker $n^4$ the cam Z strikes the roller $k$ in the cross-head $e'$ and causes it to again advance, and by effecting the engagement of the spring-hooks $i$ with the taper pins $h^8$ causes them to release their hold upon the band ends. The cross-head then recedes to its inner position. The ultimate end of the spring-tubes $O^3$ having been reached in the rotary movement of the carrying-wheel F, the bundle is released from the pressure of the tapes, falls to the ground, bound in all respects in the manner heretofore done by hand.

The machine has been described as employing straw for banding; but wire or other suitable material may be used instead.

The machine as herein described is the result of many practical experiments, and is believed to exhibit the most approved arrangement of its respective parts; but certain unimportant variations in its construction may be adopted without changing its principle. For instance, the machine, instead of being advanced through the field after the present designs, may be turned at right angles and be made to follow the reaper, the grain being delivered by suitable mechanism or by hand.

Having described my invention, I claim as new and wish to secure by Letters Patent of the United States—

1. A non-revolving cam plate and a carrying-wheel revolving upon a fixed horizontal shaft projecting from said cam-plate, combined with a system of sheaf-hooks, a system of banding and twisting mechanism, and a system of tucking devices, all deriving positive movement from the cam-plate through the medium of suitable mechanism, whereby in a single revolution of said carrying-wheel the several systems act successively and at the proper intervals of time to grasp and band the bundle, twist the band, pass the twisted ends between the band and bundle, and release the latter, substantially as hereinbefore set forth.

2. Combined with a non-revolving cam-plate and its shaft, and a carrying-wheel mounted on said shaft, a self-feeding banding device and twisting and tucking mechanisms, substantially as specified.

3. In a banding and twisting mechanism, a shaft adapted to have a limited rotary movement, and having an extension provided with parallel and diverging slots, as described, combined with a sliding head having band-arms pivoted thereto, all being supported by a carrying-wheel and rotating therewith, substantially as specified.

4. In a banding and twisting mechanism, the combination of a rotary shaft sliding head, pivoted band-arms, and spring-hooks attached to the outer extremity of said shaft, all being supported by a revolving carrying-wheel and rotating therewith, substantially as and for the purposes specified.

5. A carrying-wheel having one or more radial slots, each inclosing a sliding cross-head, a sliding head, and a shaft supported by said sliding head, combined with band-arms and mechanism for imparting an intermittent movement to said shaft in the rotary movement of the carrying-wheel, substantially as specified.

6. In a grain-binder, a carrying-wheel having a radial slot or guide, and a sliding cross-head therein carrying a roller, a sliding head having band-arms pivoted thereto, and a slotted shaft operating in conjunction with said sliding head and band-arms, and adapted to be given, in the revolution of the carrying-wheel, an intermittent movement, combined with the cams of a non-revolving cam-plate, which, when in contact with the roller of the cross-head, impart a radial movement to the latter, operating the band-arms, substantially as specified.

7. The band-arms having band-hooks pivoted at their outer extremities, the said arms being further provided with lugs, serving as inner bearings for the band-hook rods, combined with said rods, spiral springs surrounding the same, and tension-nuts, substantially as and for the purpose set forth.

8. The band-hook constructed with a projection on its outer or convex surface, and attached to the band-arm, as described, combined with a guide-plate formed upon a stationary part of the machine, which projection, on coming in contact with said stationary guide, effects the closing of the hook, substantially as and for the purpose set forth.

9. The band-hook having a conically-headed stud attached to the band-arm, combined with a spring-hook pivoted to the outer end of the twister-shaft, substantially as set forth, which conically-headed stud, upon coming in contact with said spring-hook, operates to open or cock the band-hook, as specified.

10. The twister-shaft with spring-hooks at its outer extremity, having a portion of their hooking-edges removed, as specified, combined with the sliding head and band-arms, having band-hooks with conically-headed studs, whereby the said studs are allowed to pass when the band-hooks are opened or cocked, as specified.

11. In a tucking mechanism, a tucker pivoted to a hollow shaft, having a limited longitudinal movement, and provided with stationary fingers, combined with a tucker-shaft sliding within said hollow shaft, and a link connecting said tucker-shaft and tucker, substantially as specified, whereby as the fingers hold the band the tucker, by a partial revolution, carries the twisted ends between said fingers and under the band, as set forth.

12. The tucker and fingers, the same being adapted to be advanced and retracted, substantially as specified, combined with the U-shaped stop, as set forth.

13. In the tucking mechanism, the hollow tucker-shaft having a collar at the extremity thereof opposite the tucker, combined with the hollow shaft of the oscillating sheaf-hooks, sufficient space being left between the inner face of said collar and the contiguous end of the said sheaf-hook shaft, whereby the tucker-shaft may be advanced with its accompanying parts to the proper position for operating the tucker, and be checked at that point by the contact of the said collar with the sheaf-hook shaft, as set forth.

14. The hollow tucker-shaft, the tucker end of which is constructed to admit of the play of the tucker-link, as shown, combined with the tucker-rod having a collar and spiral spring thereupon, and the tucker-link pivoted at the end of said rod to operate the pivoted tucker, substantially as set forth, whereby the forward motion of the rod continues after the collar of the tucker-shaft has engaged the oscillating sheaf-hook shaft, thus actuating the tucker, as specified.

15. The carrying-wheel and the oscillating sheaf-hooks with links and their pin, combined with the cam-plate, substantially as and for the purposes set forth.

16. The band-hopper narrowed toward its bottom and having its forward lower corner removed, and having also inclined guides arranged one in advance of the other, combined with the band-arms and band-hooks, all jointly operating substantially as set forth.

17. The cradle, combined with suspended guides, substantially as set forth, whereby the grain is admitted to the cradle, but prevented from escaping from the same as the unbound bundle is raised, as specified.

18. The compressing-tapes encompassing the carrying-wheel and the binding mechanism or mechanisms, combined with oscillating spring-tubes at the lower ends of the said tapes, substantially as set forth, whereby tension is placed on said tapes, as specified.

19. The combination of the carrying-wheel and banding and twisting mechanism, tucking devices, and sheaf-hooks mounted on said wheel with the cam-plate, cradle, compressing-tapes, and band-hopper, all arranged substantially as and for the purposes set forth.

In testimony whereof I have hereunto subscribed my name in the presence of two witnesses.

WILLIAM H. BERRY.

Witnesses:
M. L. TAYLOR,
H. W. MUNSEY.